(12) United States Patent
Kennedy et al.

(10) Patent No.: US 8,172,153 B1
(45) Date of Patent: May 8, 2012

(54) ENERGY USAGE CONTROL FOR A BUILDING

(75) Inventors: William R. Kennedy, Taylorville, IL (US); John Matthew Kennedy, Taylorville, IL (US)

(73) Assignee: Kennedy Metal Products & Buildings, Inc., Taylorville, IL (US)

( * ) Notice: Subject to any disclaimer, the term of this patent is extended or adjusted under 35 U.S.C. 154(b) by 767 days.

(21) Appl. No.: 11/321,171

(22) Filed: Dec. 29, 2005

Related U.S. Application Data

(60) Provisional application No. 60/640,703, filed on Dec. 30, 2004.

(51) Int. Cl.
*F24D 19/10* (2006.01)

(52) U.S. Cl. ............... 236/1 B; 236/94; 62/126; 62/127; 62/129; 700/276; 700/277

(58) Field of Classification Search ............... 236/1 B, 236/94; 62/129, 126, 127; 700/276, 277
See application file for complete search history.

(56) References Cited

U.S. PATENT DOCUMENTS

| | | |
|---|---|---|
| 4,110,827 A | 8/1978 | Shavit |
| 4,205,381 A | 5/1980 | Games et al. |
| 4,217,646 A | 8/1980 | Caltagirone et al. |
| 4,940,079 A * | 7/1990 | Best et al. ............... 165/236 |
| 5,444,436 A * | 8/1995 | Kennison ............... 340/635 |
| 5,544,036 A | 8/1996 | Brown, Jr. et al. |
| 5,566,084 A | 10/1996 | Cmar |
| 5,650,940 A * | 7/1997 | Tonozuka et al. ............ 709/224 |
| 5,682,329 A * | 10/1997 | Seem et al. ............... 700/276 |
| 6,154,681 A | 11/2000 | Drees et al. |
| 6,219,590 B1 | 4/2001 | Bernaden, III et al. |
| 6,241,156 B1 | 6/2001 | Kline et al. |
| 6,276,148 B1 * | 8/2001 | Shaw ............... 62/117 |
| 6,290,140 B1 * | 9/2001 | Pesko et al. ............... 236/47 |
| 6,408,228 B1 | 6/2002 | Seem et al. |
| 6,478,233 B1 * | 11/2002 | Shah ............... 236/46 R |
| 7,019,855 B1 * | 3/2006 | Lee ............... 358/1.15 |
| 2005/0004682 A1 * | 1/2005 | Gaddis et al. ............... 700/9 |

* cited by examiner

*Primary Examiner* — Frantz Jules
*Assistant Examiner* — Azim Rahim
(74) *Attorney, Agent, or Firm* — Senniger Powers LLP

(57) ABSTRACT

Controlling energy usage of a building. At least one temperature sensor monitors temperature within a zone of a building. A processor determines an off-peak temperature target as a function of a duration of an off-peak operating state of the monitored zone and a desired temperature within the monitored zone during a subsequent peak operating state of the monitored zone. A controller receives the determined off-peak temperature target and is responsive to the received off-peak temperature target to control the temperature within the monitored zone of the building during the off-peak operating state. Other aspects of the invention are directed to computer-readable media for controlling energy usage of a building as described.

35 Claims, 5 Drawing Sheets

ENERGY USAGE CONTROL FOR A BUILDING

TECHNICAL FIELD

Embodiments of the present invention relate to the field of controlling energy usage of a building. In particular, embodiments of this invention relate to monitoring zones of a building to optimize energy usage of the building.

BACKGROUND OF THE INVENTION

The energy consumed for heating and cooling a building, and therefore the cost of heating and cooling, is a function of the difference between inside and outside temperatures of the building. When the inside and outside temperatures are the same, no heat generally flows into or out of the building. Further, a larger difference between the inside and outside temperatures generally results in more heat flowing into or out of the building. Accordingly, heat flowing out of the building during the heating season (e.g., winter) and heat flowing into the building during the cooling season (e.g., summer) generally require purchased energy (e.g., natural gas, electricity, etc.) to offset the flow so that a desired interior temperature of the building may be maintained.

As can be seen, if one can somehow control the inside temperature of the building to be as close to the outside temperature as possible during times when the building is not in use (e.g., nights, weekends, holidays, etc. for a commercial building), the amount of heat transferring into or out of the building during these times may be minimized. If the amount of heat transfer is minimized, then the cost of heating and cooling the building may be reduced as well.

Conventional heating and cooling systems employ a thermostat in the building to maintain a relatively uniform temperature in the building all the time. But this approach may result in a situation where heat loss during a non-use period of the building is greater than if the maintained temperature in the building is adjusted somewhat. That is, in this conventional approach, the maintained temperature in the building is not adjusted to reflect the changing temperature outside of the building.

Use of a timed thermostat or a timing device connected to a regular thermostat is one approach to remedy such a situation. For example, if the occupation time for a building is 7 a.m. to 5 p.m., one may lower the building's desired temperature from 72 degrees to a setback temperature of 62 degrees (in Fahrenheit) for the period from 5 p.m. to 6 a.m., during which the building is not being used. This is often referred to as a setback. However, further complications may arise from such timed temperature control.

In this prior approach, the selection of the building's desired temperature and non-use period is arbitrary. In the example above, there is no definite indication that maintaining a desired temperature of 62 degrees from 5 p.m. to 6 a.m. would maximize energy savings. For instance, returning the building's temperature to 72 degrees at 6 a.m. may not have been the optimum time with respect to energy savings. If the temperature was mild outside, returning the space to 72 degrees could have been put off until closer to the occupation time for the space. Further, the setback temperature (i.e. 62 degrees) itself was arbitrary, and more energy savings would result if the setback could have been lower. If, however, the setback is too low and the setback period too long, then the heating equipment is not be able to return the space to 72 degrees by the occupation time. For example, if it is very cold, 1 hour (e.g. 6 a.m. to 7 a.m.) may not be enough time for the heating equipment to raise the temperature back to 72 degrees from 62 degrees by the occupation time for the space (i.e. 7 a.m.). Thus, this approach fails to maximize energy savings in that the setback time and period are arbitrarily chosen, and it may fail to maintain a desired temperature during the occupation times of the building.

Also, during a long period of non-use (e.g., periods that last for days or weeks), the prior approach does not allow adjustment of the building's desired temperature because it is controlled by a simple timer. For instance, if the inside temperature of the building is set to be lowered on weekends during which the building is normally not in use, the prior approach does not automatically adjust the inside temperature (e.g., returning to normal room temperature) for an event to be held in the building during a particular weekend.

In light of these deficiencies of the prior systems and methods, a solution is desired to effectively control energy usage of a building.

SUMMARY OF THE INVENTION

Embodiments of the invention overcome one or more deficiencies in the prior art by providing, among other things, improved control of energy usage of a building. According to one embodiment, the invention advantageously monitors a temperature within a zone of the building. In another embodiment, the invention further accounts for weather conditions. In this instance, the invention obtains weather condition information, including a weather influence on the monitored zone, which is a composite measure of various weather factors that may affect the temperature within the zone. Embodiments of the invention also advantageously allow determining a duration of an off-peak operating state of the monitored zone, which represents that the zone is not in use, and setting a desired temperature within the monitored zone during a subsequent peak operating state of the zone, which represents that the zone is in use. One embodiment of the invention then controls the temperature (e.g., via a proportional-integral-derivative (PID) controller) within the monitored zone during the off-peak operating state as a function of the duration of the off-peak operating state, the desired temperature during the subsequent peak operating state, and optionally the obtained weather condition information. One or more other embodiments of the invention further advantageously monitor a climate control system of the building and provide an alarm in response to an error in controlling energy usage of the building. Moreover, the features of embodiments of the present invention described herein are economically feasible, commercially practical, and easier to implement than currently available techniques.

Briefly described, a method embodying aspects of the invention controls the energy usage of a building that has one or more zones. Each zone of the building has a peak operating state and an off-peak operating state. The method includes monitoring a temperature within a zone of the building and determining an off-peak temperature target as a function of a duration of an off-peak operating state and a desired temperature during a subsequent peak operating state of the monitored zone. The method also includes controlling the temperature within the monitored zone of the building during the off-peak operating state as a function of the determined off-peak temperature target.

In another embodiment, a system for controlling the energy usage of a building includes at least one temperature sensor to monitor a temperature within a zone of the building. Each zone of the building has a peak operating state and an off-peak operating state. The system also includes a processor for executing computer-executable instructions to determine an off-peak temperature target as a function of a duration of an off-peak operating state and a desired temperature during a subsequent peak operating state of the monitored zone. A controller of the system receives and responds to the determined off-peak temperature target for controlling the temperature within the monitored zone of the building during the off-peak operating state.

One or more computer-readable media having computer-executable components for controlling energy usage of a building include an internal parameter component for monitoring a temperature within a zone of the building. The computer-readable media also include a temperature set component for determining an off-peak temperature target as a function of a duration of an off-peak operating state and a desired temperature during a subsequent peak operating state of the monitored zone. A control component regulates the temperature within the monitored zone of the building during the off-peak operating state as a function of the determined off-peak temperature target.

Computer-readable media having computer-executable instructions for performing methods of controlling energy usage of a building embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
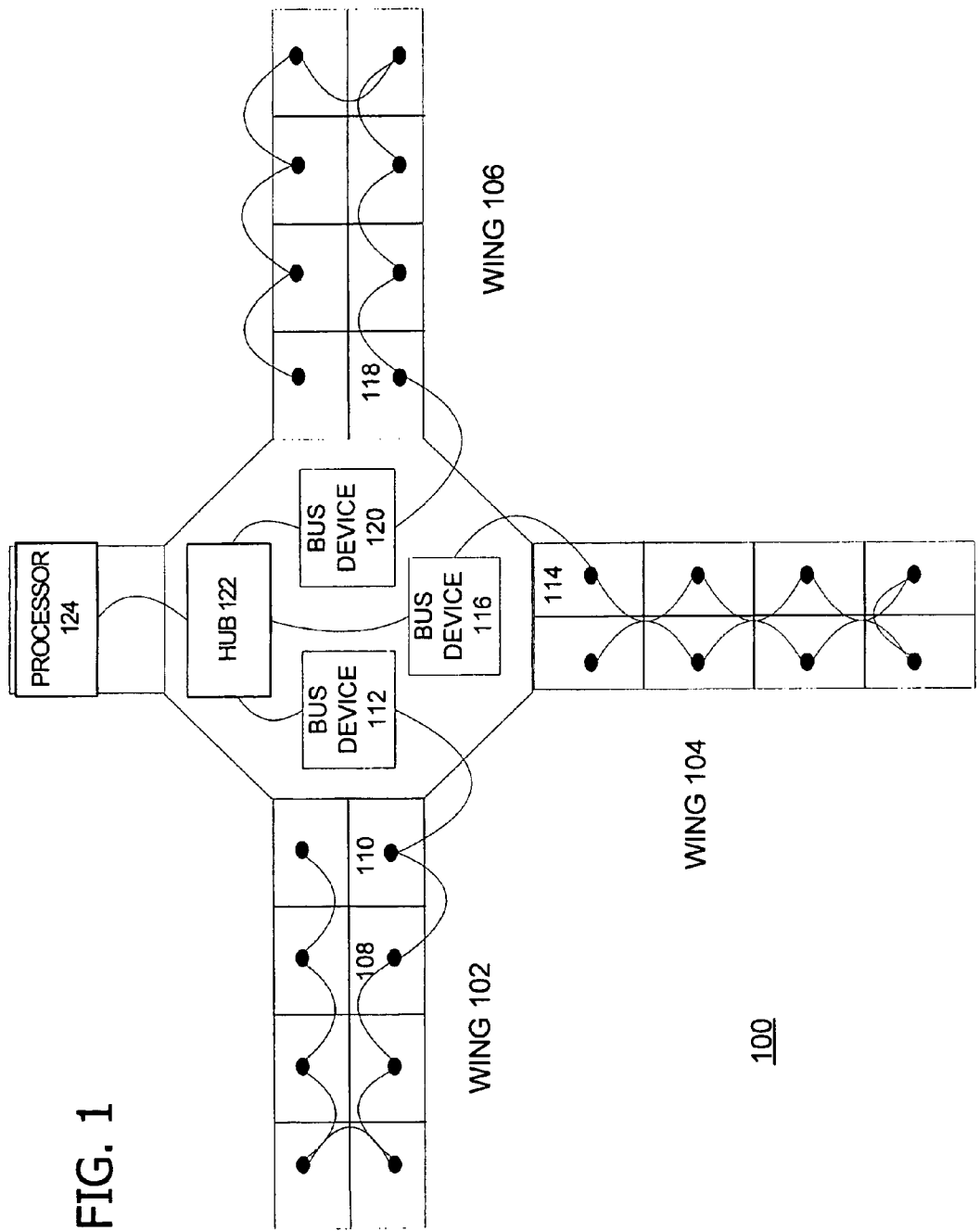
FIG. 1 is a block diagram illustrating an exemplary environment in which embodiments of the present invention may be utilized.

Referring first to FIG. 1, a block diagram illustrates an exemplary environment in which embodiments of the invention may be utilized. Embodiments of the invention relate to controlling energy usage of an exemplary building 100. Particularly, embodiments of the invention control inside temperature of the building 100 to reduce the cost of energy usage. It is to be understood that the architectural structure of building 100 in FIG. 1 is for illustration purposes. Embodiments of the invention may be implemented in buildings with other types of structures.

As shown in FIG. 1, building 100 includes a wing 102, a wing 104, and a wing 106. Further shown in FIG. 1, each wing of building 100 has several different zones (e.g., rooms). The thermal characteristics of a given zone may be unique to that zone. Another zone in building 100 may have a different set of characteristics based on its makeup, its location with respect to other zones, the direction it faces, the capability of the climate control system installed in it, and other factors.

FIG. 1 shows one embodiment of the invention in which each zone of building 100 has a monitoring device (shown as a dot in each zone). Connected to the monitoring device are a controller for a climate control system (e.g., a heating, ventilation, and/or air conditioning (HVAC) system) and a temperature sensor for the zone. The monitoring device of each zone is connected to another monitoring device of an adjacent zone. For example, as illustrated in FIG. 1, the monitoring device of zone 108 located at the wing 102 is connected to at least the monitoring device of zone 110 also located at wing 102. As shown in FIG. 1, the monitoring device of zone 110 is connected to a bus device 112. The monitoring device of zone 114 located at the wing 104 is connected to a bus device 116. And the monitoring device of zone 118 located at the wing 106 is connected to a bus device 120. Further, the bus devices 112, 116, and 120 are connected to a hub 122 located in building 100, thus allowing the monitoring devices of building 100 to be connected to a network (e.g., a LAN). In one embodiment of the invention, connection of a monitoring device to another monitoring device or to a bus device is via an RJ-11 connector, while connection of a bus device to a hub is via an RJ-45 connector used in conventional LAN cables. The bus devices 112, 116, and 120 convert the signals from these monitoring devices to a local area network (LAN) signal (e.g., Transmission Control Protocol over Internet Protocol (TCP/IP) Ethernet signal). In an alternative embodiment, the monitoring devices are directly connected to a LAN and can communicate via TCP/IP.

If desired, multiple bus devices may be installed in the same building and connected to the same network at different locations of the building. This may be helpful in some building layouts where multiple "chains" of monitoring devices are physically separated by relatively large distances. Accordingly, the building's layout is exploited to accomplish the various connections, thus simplifying wiring of the monitoring devices and the bus devices.

In FIG. 1, the hub 122 is connected to a processor 124 located within building 100, which allows a user to assign a monitoring device to a particular zone of building 100. But the network of building 100 may allow the processor 124 to be located anywhere within the network, or if desired, anywhere in the world via the Internet. Accordingly, a monitoring device of building 100 may continue with its last instruction set if the connection to processor 124 is not working properly. The system is therefore at least partially immune to a network or processor outage.

In an alternative embodiment of the invention, if building 100 has not been installed with a network, a network cable (e.g., a Category 5 (Cat-5) cable) may be run from the bus devices to processor 124 or to an Internet connection.

Figure 2:
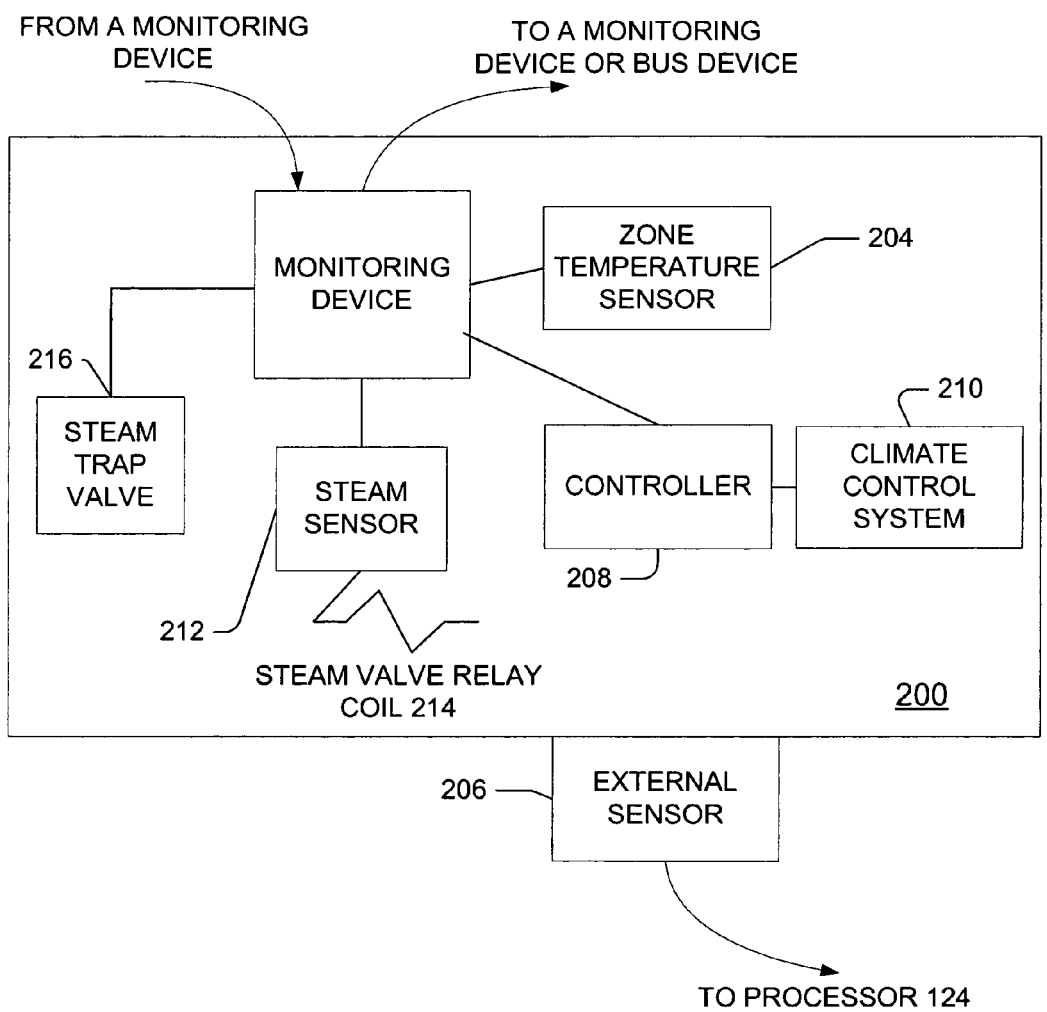
FIG. 2 is a block diagram illustrating an exemplary monitoring device for monitoring one or more parameters relating to controlling energy usage of a building according to one embodiment of the invention.

Referring to FIG. 2, a block diagram illustrates a zone 200 of building 100 that has been installed with an exemplary monitoring device 202, which monitors one or more parameters relating to energy usage of zone 200. As can be seen, the monitoring device 202 receives input from another monitoring device installed at another zone in building 100. Further, the output of monitoring device 202 is communicated to another monitoring device installed at yet another zone or to a bus device. Monitoring device 202 is connected to at least one temperature sensor installed in zone 200. In FIG. 2, for example, monitoring device 202 is connected to a zone temperature sensor 204 of zone 200. The zone temperature sensor 204 is adapted to continuously monitor a temperature within zone 200. Zone temperature sensor 204 is further adapted to communicate the monitored temperature of zone 200 to processor 124 via monitoring device 202.

In one embodiment of the invention, processor 124 located within building 100 or elsewhere executes a program to allow a user to perform an operation relating to energy control of zone 200. Particularly, processor 124 executes a calendar program where a control setting of zone 200 may be set up or modified. Further, the calendar program allows the user to preset a peak operating state and an off-peak operating state for zone 200 as well as a duration for each state. The user thus may preset the peak and off-peak operating states based on expected building usage in zone 200. In general, the peak operating state represents a state during which zone 200 is being used, and accordingly the temperature in zone 200 during the duration of this state is desirable to be within a range of temperatures suitable for the usage of zone 200. On the other hand, the off-peak operating state represents a state during which zone 200 is not being used. Thus, the temperature in zone 200 during the duration of this off-peak operating state is desirable to be at a level closer to the temperature outside of zone 200.

The user may set a peak operating state and an off-peak operating state for zone 200 ahead of time or impromptu. For example, if zone 200 is normally not in use on weekends, the user may preset zone 200 to be in the off-peak operating state on weekends. But if a certain event is to be held in zone 200 during a particular weekend, the user may set a period within this particular weekend during which the event is to be held as peak operating state.

In an embodiment of the invention, an external sensor 206 installed outside of zone 200 (e.g., on a single-pane window or shaded window area) may be used to obtain information representative of a weather condition near zone 200. The external sensor 206 then outputs the obtained weather condition information to processor 124 (e.g., also via monitoring device 202). Embodiments of the invention operate with one external sensor 206 per system, but a system may also use more than one external sensor (e.g., one external sensor per zone). Alternatively, processor 124 may obtain the information regarding the weather condition near zone 200 via other sources. For example, this information may be obtained via the Internet from a site or service that provides specific weather information for a particular area. The obtained weather condition information generally indicates a weather influence on zone 200. Specifically, the weather influence indicates the variability of the weather near zone 200 and is a composite measure of various weather factors that influence zone 200. Further, a greater weather influence on zone 200 will have a greater impact on the inside temperature of zone 200.

One factor of the weather influence is an ambient temperature outside of zone 200. Another factor of the weather influence is an ambient wind outside of zone 200. Stronger wind causes a greater effect on zone 200 through degradation of the stationary or boundary layer static of air outside of zone 200 and increased infiltration loss resulting from increased leakage around doors, windows, ventilator openings, etc. Thus, a day of strong wind and mild ambient temperature may be determined as high weather influence compared with a day of weak wind and mild temperature because of the high assertion of surrounding air on zone 200 resulting from the strong wind. In one embodiment of the invention, if the ambient temperature outside of zone 200 is lower than normal room temperature (e.g., 75 degrees Fahrenheit), then a higher weather influence on zone 200 causes the temperature within zone 200 to become lower. In contrast, if the ambient temperature outside of zone 200 is higher than the normal room temperature, then a higher weather influence causes the temperature within zone 200 to become higher. In other words, energy usage for obtaining a desired temperature is greater for periods of high weather influence. Other factors of the weather influence include wind speed, wind direction, humidity, dew point, cloudiness, precipitation, and sunlight intensity. External sensor 206 records such factors and communicate them to processor 124. Alternatively, processor 124 may obtain such factors from another source (e.g., the Internet). Processor 124 will then analyze these weather factors to determine a composite measure (i.e., a defined weather influence parameter) for controlling the inside temperature of zone 200.

Based on the obtained weather condition information, processor 124 may calculate an off-peak temperature target representative of a desired temperature within zone 200 during an off-peak operating state. In one embodiment, processor 124 calculates the off-peak temperature via a PID controller, which implements an enthalpy control algorithm to calculate the off-peak temperature target as a function of the weather condition information. For example, the enthalpy control measures both the sensible and latent heat in the ambient air outside of zone 200 to consider the effect of the ambient air on the temperature within zone 200 (e.g., cool and dry air may result in a lower inside temperature).

It is also important to note that additional energy savings can be attained utilizing the information provided by outside weather data. The system can begin heating zone 200 to the peak temperature target by simply venting outside air into zone 200 when air outside zone 200 has a greater enthalpy than the air inside zone 200. Conversely, when the air enthalpy outside zone 200 is less than that of the air inside zone 200 the system can achieve additional energy savings by venting the outside air into zone 200 in order to begin lowering the temperature in zone 200 to the peak target temperature.

An additional input to the processor 124 may be a carbon dioxide sensor in zone 200. Schools in particular have legislated levels of air exchange or "fresh air". Many authorities have accepted monitoring and controlling carbon dioxide levels to be sufficient compliance with these regulations. The processor may consider the carbon dioxide level in zone 200 when determining the off peak temperature target. If the carbon dioxide level needs to be reduced when returning zone 200 to a peak target temperature, additional outside air is going to be required. In a heating season, this means that a higher off peak temperature target or shorter setback period may be determined, depending on the capacity of the heating system, because it will take more energy to heat the incoming outside air than if the system was only recirculating the air in zone 200. The converse is of course true for a cooling season.

The off-peak temperature target is calculated to optimize the overall energy usage of zone 200 during both the peak and the off-peak operating states. In general, a greater weather influence will result in a greater adjustment of the off-peak temperature target. Thus in a heating season (e.g., winter), the PID controller will calculate a lower off-peak temperature target in response to a higher weather influence on zone 200. On the other hand, in a cooling season (e.g., summer), the PID controller will calculate a higher off-peak temperature target in response to a higher weather influence on zone 200. Processor 124 then communicates the calculated off-peak temperature target to monitoring device 202 via a bus device and possibly a series of other monitoring devices. Monitoring device 202 then communicates the off-peak temperature target to a controller 208 of a climate control system 210 installed in zone 200 to maintain the temperature within zone 200 at about this off-peak temperature target during a set off-peak operating state. Monitoring device 202 and/or processor 124 may then indicate or display the current temperature within zone 200.

As one example, if zone 200 is normally not in use during 6 p.m. to 7 a.m. on each weekday, the user may preset this period as off-peak operating state. Accordingly, processor 124 will calculate an off-peak temperature target for zone 200, and the controller 208 will control the climate control system 210 during this period in accordance with this off-peak temperature target. Taking into account other weather factors that may affect the inside temperature of zone 200, the off-peak temperature target during this period is calculated to be in a level near the ambient temperature outside of zone 200. As the ambient temperature outside of zone 200 and other weather factors change during the duration of the off-peak operating state, processor 124 will continuously receive the updated weather condition information from external sensor 206 or via another source. And processor 124 will continuously update the off-peak temperature target for zone 200 based on the updated weather condition information.

According to one embodiment of the invention, processor 124 also calculates the off-peak temperature target for zone 200 based on a duration of the off-peak operating state. Generally, in a heating season, the temperature setback in zone 200 during the off-peak operating state is proportional to the duration of the off-peak operating state. That is, the longer the duration of the off-peak operating state, the deeper the temperature setback for zone 200. Accordingly, the energy consumed by climate control system 210 to control the inside temperature of zone 200 for a subsequent peak operating state is minimized by the deeper temperature setback if the off-peak duration is relatively long. On the other hand, if the off-peak duration is relatively short, the heating equipment may not have the capability to bring the temperature back to the on-peak value on time if the setback it too deep when outside conditions are severe. The setback depth is calculated by the system accordingly. As an example, during a heating season, if the user has preset the period from 6 p.m. to 7 a.m. on each weekday and weekends (i.e. 6 p.m. Friday to 7 a.m. Monday) as off-peak operating states, then processor 124 may calculate a lower off-peak temperature target for the weekends than for the period from 6 p.m. to 7 a.m. on each weekday. Conversely, in a cooling season, processor 124 may calculate a higher off-peak temperature target for longer off-peak durations than for relatively shorter off-peak durations.

According to another embodiment of the invention, processor 124 may further calculate the off-peak temperature target as a function of a peak temperature target preset by the user via processor 124 and representative of a desired temperature within zone 200 during a subsequent peak operating state. In general, processor 124 is adapted to calculate the off-peak temperature target as nearer to the ambient temperature outside of zone 200 (taking into account other weather factors) than the peak temperature target. Furthermore, the off-peak temperature target is generally calculated to be proportional to the peak temperature target. That is, processor 124 may calculate a higher off-peak temperature target for a higher peak temperature target. For example, if the user sets a high peak temperature target in a heating season, a deep setback for zone 200 during the off-peak operating state may cause climate control system 210 to use a substantial amount of energy to raise the inside temperature of zone 200 from the off-peak temperature target to the peak temperature target. But climate control system 210 may not require such a large amount of energy to raise the inside temperature from the deep setback if the user sets a relatively low peak temperature target for the subsequent peak operating state. Thus, if the user sets a relatively low peak temperature target for the subsequent peak operating state, processor 124 may calculate a lower off-peak temperature target and thus a deeper temperature setback for zone 200 during the off-peak operating state. This aspect of the invention is similarly applicable to cooling seasons. In yet another embodiment, processor 124 will calculate an off-peak temperature target so that the difference between the off-peak temperature target and the peak temperature target is greater for a relatively longer duration off-peak operating state than for a relatively shorter duration off-peak operating state.

As discussed, the user may input a peak temperature target representative of a desired temperature during a peak operating state. During the peak operating state of zone 200, processor 124 will communicate this peak temperature target to controller 208 via monitoring device 202. Controller 208 is responsive to the received peak temperature target to control climate control system 210 so the temperature within zone 200 is maintained at about this peak temperature target during the peak operating state. Monitoring device 202 and/or processor 124 may then indicate or display the current temperature within zone 200.

In one embodiment of the invention, the processor 124 uses a simplified algorithm to determine how to control the climate control system 212. The processor sets a minimum temperature (e.g. 40 degrees Fahrenheit) for the off-peak periods and disables the heating system at the end of a peak operating state. The processor 124 must then only determine when to enable the heating system such that the desired temperature during a subsequent peak operating state will be reached at the beginning of the subsequent peak operating state. The processor makes this calculation based on weather conditions outside zone 200 and the capacity of the heating system of the climate control system 212. The converse is true in a cooling season. A slightly more complex version of this algorithm may take into account the length of time the temperature can be down. For example, if the temperature is 15 degrees outside of zone 200 and the climate control system 212 is near capacity simply maintaining the current desired temperature for the peak operating state, and the off peak period is only 12 hours long, then the processor 124 may not allow a setback at all. If however, the off peak period is 15 days and the temperature is 15 degrees outside of zone 200, then the system may let the temperature fall to the minimum, but start recovering the temperature in zone 200 several days before end of the off peak period.

Embodiments of the invention also provide a function to monitor climate control system 210 of zone 200. For example, a steam trap monitoring function is capable of monitoring the operation of a steam trap used in a steam system (e.g., a two-pipe steam heating system). As shown in FIG. 2, monitoring device 202 of zone 200 includes an input that is connected to a steam sensor 212 (e.g., a pipe temperature sensor) located downstream of the steam trap (e.g., at a steam valve relay coil 214). Thus, if the steam trap malfunctions, the steam sensor 212 will detect steam temperature in a condensate piping. Monitoring device 202 will then report this malfunction of the steam trap to processor 124. Since some energy losses may result from steam trap malfunctions, this steam system monitoring by monitoring device 202 and processor 124 helps to reduce energy loss by detecting a malfunction when it occurs and removing the requirement for steam trap maintenance. Having monitoring device 202 monitoring the steam trap, the trap may operate without constant maintenance until it malfunctions. This may result in increased energy and maintenance savings for some buildings.

In addition to the steam trap monitoring function, aspects of the invention may include an improved steam trap. The trap may be an electric solenoid or motorized valve. In this embodiment, the monitoring device 202 has an additional output to control the valve. When the system calls for heat in zone 200, the monitoring device 202 causes both the supply valve and the trap valve 216 to open and steam enters the radiator. Steam sensor 212 senses when the condensate pipe has warmed up and the trap valve is closed. When the condensate pipe temperature drops below the steam temperature, the system reopens the trap valve 216. The trap valve 216 thus functions as a thermostatic trap, but is electrically controlled instead of mechanically controlled and therefore requires less maintenance. The electric trap valve 216 may be controlled by monitoring device 202 as a simple thermostatic trap valve, or it may be controlled by the processor 124 wherein the PID controller can learn the condensing rate of the radiator and make intelligent decisions regarding when to open the valve and for how long. The PID controller can predict when the valve needs to open and for how long and could even allow water to accumulate in the radiator to any desired degree to minimize the number of times the valve would open and close. The PID controller associated with processor 124 may also predict when the trap valve needs to be closed accurately enough to prevent any live steam from entering the condensate pipe thus preventing unnecessary energy loss.

Similarly, other sensors connected to monitoring device 202—with processor 124 receiving information from monitoring device 202 if a malfunction occurs—may monitor a number of conditions including steam trap operation, boiler water level, boiler pressure, boiler temperature, hydronic water temperature, hydronic water pressure, and water level in a condensate well. For example, considering the installation of a pressure switch downstream of a hydronic circulating pump in building 100, if an expansion joint develops a leak or if the pump malfunctions, a user of processor 124 may be notified of this situation immediately. Monitoring device 202 and processor 124 may also monitor a pressure switch on a steam boiler. If a burner fails and the steam pressure drops, monitoring device 202 may notify the user via processor 124 of the situation before the temperature within zone 200 starts to decrease. Monitoring device 202 may also monitor other operations relating to climate control such as water level in a condensate well and boiler water level.

Monitoring device 202 may further provide a function to monitor operations unrelated to climate control. For example, monitoring device 202 may receive an input from an intrusion or fire alarm and then communicate this alarm to processor 124. In fact, embodiments of the invention may be implemented to create a stand-alone intrusion and fire alarm system.

In one embodiment of the invention, access to control of processor 124 is divided into two levels. A system administrator control is implemented in processor 124 for system setup and information readout functions. The system administrator control allows a user in charge of the energy control system to setup or modify control settings of monitoring devices and bus devices and is accessible by an administrator password. On the other hand, a local administrator control implemented in processor 124 is accessible by a different password and allows a user responsible for controlling energy usage of building 100 to input or change settings relating to usage of building 100. For example, a user having access to the local administrator control may setup or modify peak and off-peak operating states for zone 200. This user may also decide a desired temperature within zone 200 during a peak operating state (i.e., peak temperature target). In one embodiment of the invention, access to system setup functions of the energy control system (e.g., control settings of monitoring devices and bus devices) is not allowed in the local administrator control mode.

In either the system administrator control mode or the local administrator control mode, a user may view historical data via processor 124. For example, processor 124 may display the temperature of zone 200 over time relative to information representative of a weather condition near zone 200 (e.g., ambient temperature outside of zone 200). Typically, the historical data includes a graph that plots the sensed temperature within zone 200 and the calculated off-peak temperature target simultaneously against time. In addition, performance data of the energy control system and a historical record of the inside temperature of zone 200 are generally available from processor 124. In one embodiment of the invention, access to the historical data is controlled and limited to a user responsible for controlling the temperature within zone 200.

In the event of a system malfunction or an emergency (e.g., the inside temperature of zone 200 does not remain at about the off-peak temperature target during the off-peak operating state, fire alarm in zone 200, etc.), this malfunction or emergency may be reported to a user via an intelligent call-out system implemented in processor 124.

In a first example, low hydronic water pressure in a climate control system of building 100 may indicate that building 100 is being flooded, which causes building 100 to lose its source of heat. In a second example, a steam pressure switch connected to a boiler that closes its contact when the boiler pressure drops to less than one pound per square inch (PSI) may indicate a boiler firing or other problems. In response to such situations, the intelligent call-out system implemented in processor 124 may obtain a list of phone numbers in response to detection of such problems. The call-out system then calls each phone number and plays a message describing what caused the alarmed condition. For the second example above, the message may state: "The steam pressure in boiler number 3 at building 100 has fallen below one PSI. There is no heat available from this boiler. A boiler-firing problem is assumed. Please take immediate action. Further, use the prescribed method to acknowledge the receipt of this message." The call-out system then replays this message for a predetermined length of time (e.g., 3 minutes).

During the period when the message is played, processor 124 takes notice for a specific touch-tone or other indications as an acknowledgment code that a user who knows the code has received the message. If processor 124 receives an acknowledgment, it will stop playing the message to the currently called number and will not call other numbers on the list. If processor 124 does not receive an acknowledgment from the currently called number after the predetermined length of time, it will proceed to call the next number on the list. If at the end of the list, processor 124 still does not receive an acknowledgment, it will repeat calling the numbers on the list and provide the alarm message as described above. In one embodiment of the invention, the intelligent call-out system may call any type of number, including a pager number, etc.

Two courses of actions are available for a user who received the alarm message. If the user receives the message and decides that an immediate action should be taken, he or she may proceed to perform a remedial action without acknowledging the receipt of the alarm message. The call-out system of processor 124 will then call the next number on the list to alarm the next user. The intelligent call-out system may thus be utilized for an alarmed condition where several users are to be notified. Alternatively, the called user may acknowledge the receipt of the alarm message so he or she may take an appropriate action alone or with one or more other users who have previously been notified of the alarmed condition.

Figure 3:
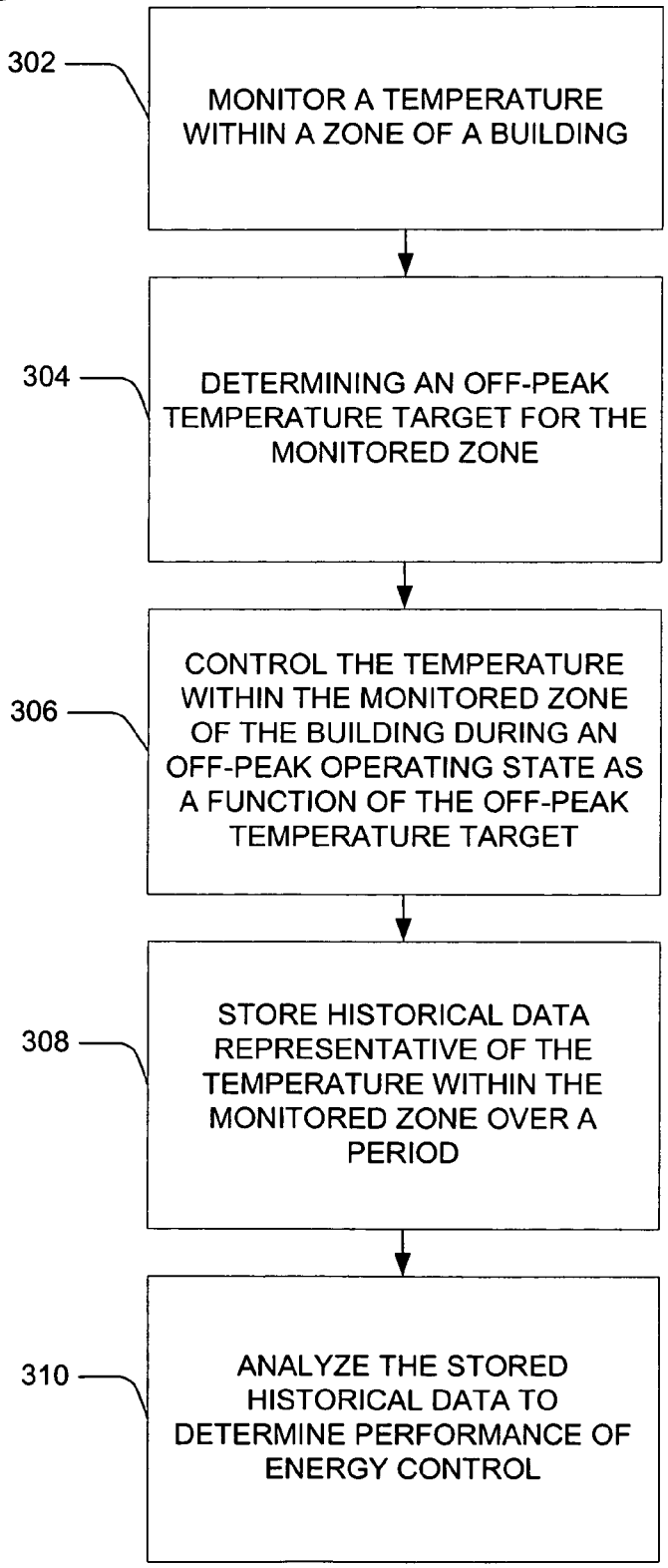
FIG. 3 is an exemplary flow diagram illustrating process flow according to one embodiment of the invention for controlling energy usage of a building.

FIG. 3 generally illustrates one exemplary method for controlling energy usage of a building according to one embodiment of the invention. At 302, a temperature within a zone of the building is monitored. At 304, an off-peak temperature target representative of a desired temperature within the monitored zone during an off-peak operating state is determined. This off-peak temperature target is determined as a function of a duration of a preset off-peak operating state of the monitored zone, a peak temperature target representative of a desired temperature within the monitored zone during a subsequent peak operating state, and optionally information representative of a weather condition. The weather condition information includes a weather influence on the monitored zone, which may further include ambient temperature outside of the monitored zone, wind speed, wind direction, humidity, dew point, cloudiness, precipitation, and sunlight intensity. Generally, during a heating season, a lower off-peak temperature target is determined for a longer duration off-peak operating state and/or for a greater weather influence on the monitored zone. During a cooling season, a higher off-peak temperature target is determined for a longer duration off-peak operating state and/or for a greater weather influence on the monitored zone. In addition, a lower off-peak temperature target is determined for a lower subsequent peak temperature target. So the off-peak temperature target is determined such that the difference between the off-peak temperature target and the subsequent peak temperature target is greater for a relatively longer duration off-peak operating state than for a relatively shorter duration off-peak operating state.

At 306, the temperature within the monitored zone during the off-peak operating state is controlled as a function of the off-peak temperature target. The temperature of the monitored zone is maintained at about the off-peak temperature target, which is nearer to the ambient temperature outside of the monitored zone than the peak temperature target. At 308, historical data representative of the temperature within the monitored zone over a period relative to the weather condition information is stored. The historical data also includes the off-peak temperature target over this period. At 310, the stored historical data is analyzed to determine performance and effectiveness of energy control for the building.

Figure 4:
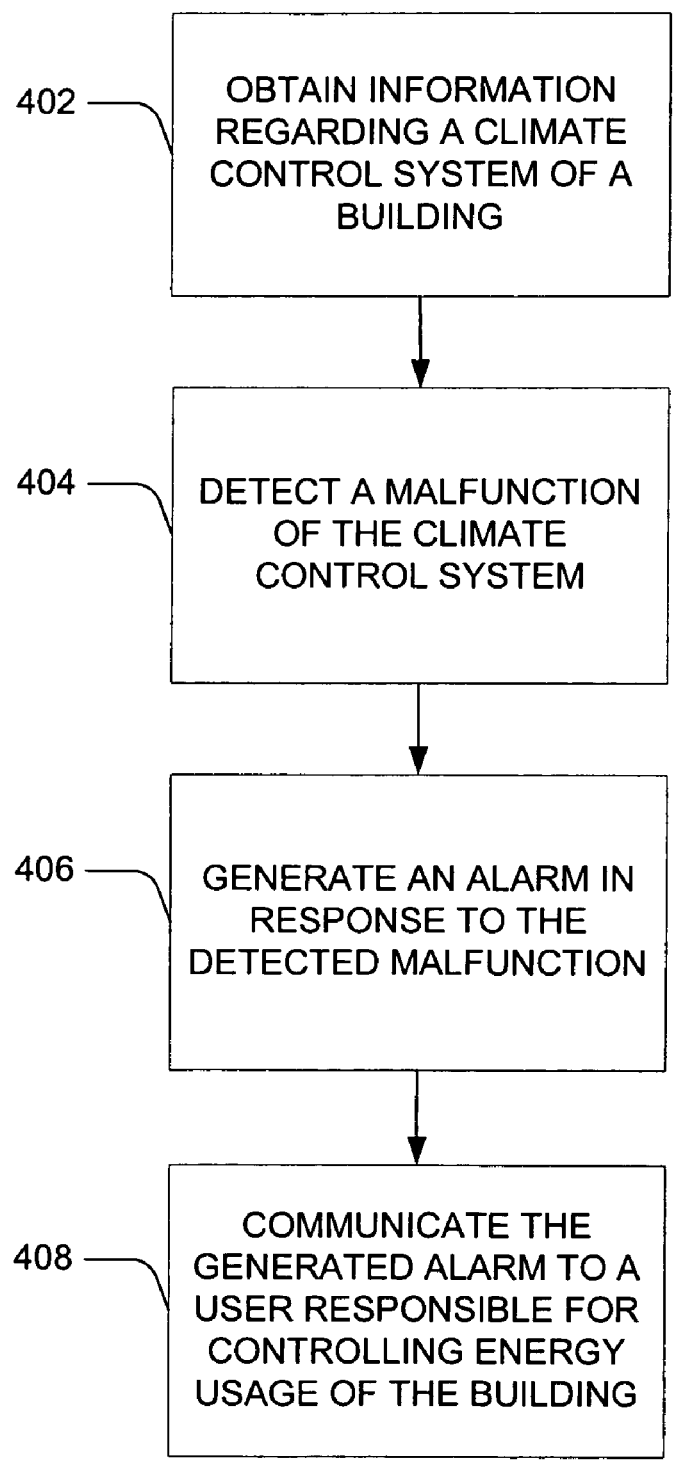
FIG. 4 is an exemplary flow diagram illustrating process flow according to one embodiment of the invention for detecting and alarming an error relating to controlling energy usage of a building.

FIG. 4 generally illustrates one exemplary method for detecting and reporting an error relating to controlling energy usage of a building. At 402, information regarding a climate control system of the building is obtained. For example, this information may relate to steam trap operation, boiler water level, boiler pressure, hydronic water temperature, hydronic water pressure, water level in a condensate well, etc. At 404, the obtained information is analyzed to detect a malfunction of the climate control system and thus an error in energy usage of the building. At 406, an alarm is generated in response to the detected malfunction or error. At 408, the generated alarm is communicated to a user responsible for controlling energy usage of the building. For example, a list of numbers (e.g., phone number or pager number) may be obtained in response to the generated alarm. Then each number on the list is called until an acknowledgment is received. For each number called, a message describing the detected malfunction or error is communicated to the recipient for a predetermined period or until the acknowledgment is received. If no acknowledgment is received after each number on the list is called, then such call-out is repeated beginning at the first number on the list.

Figure 5:
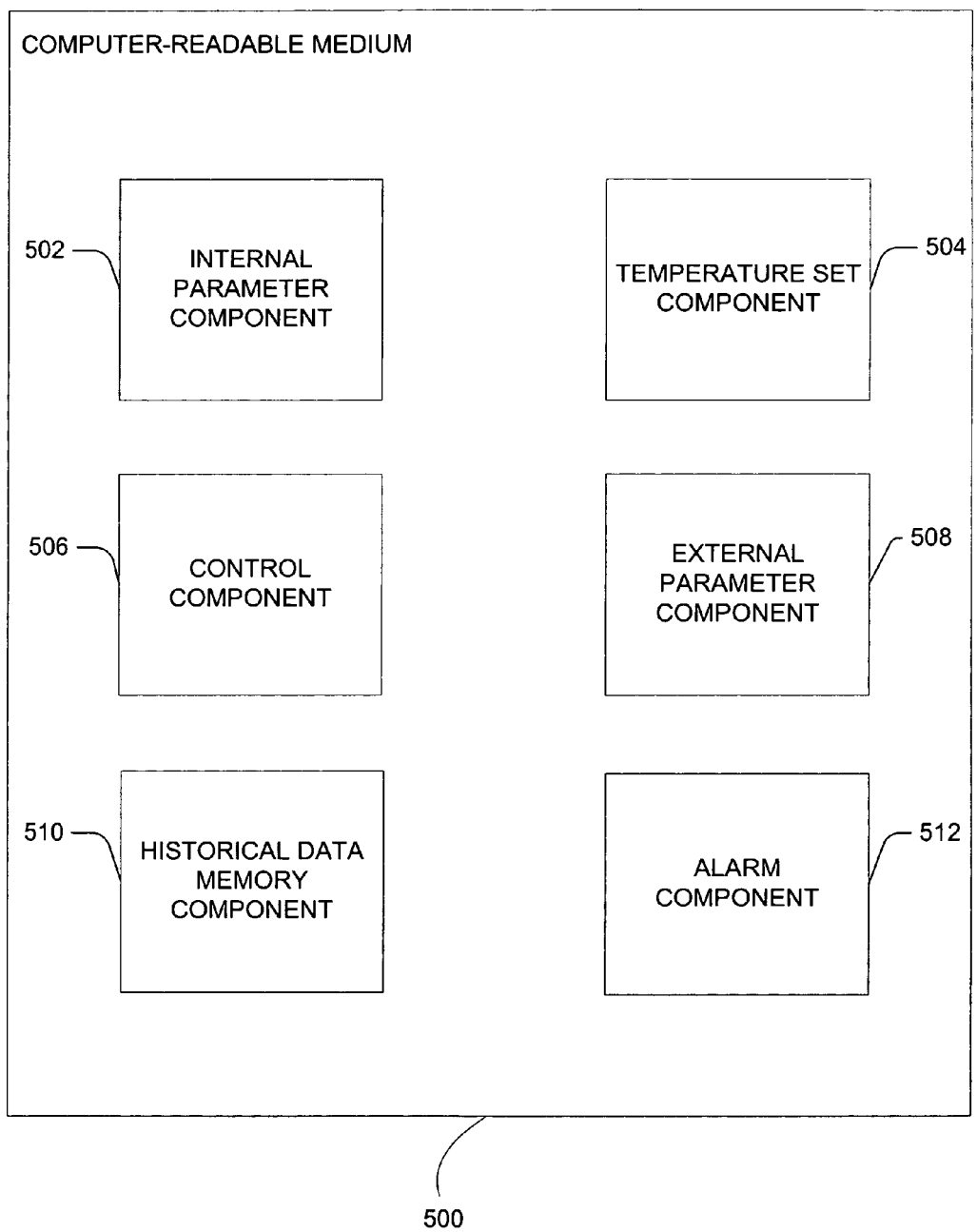
FIG. 5 is a block diagram illustrating an exemplary computer-readable medium according to one embodiment of the invention.

FIG. 5 is a block diagram illustrating an exemplary computer-readable medium 500 according to one embodiment of the invention. As shown, the computer-readable medium 500 includes an internal parameter component 502, a temperature set component 504, a control component 506, an external parameter component 508, a historical data memory component 510, and an alarm component 512. However, it is contemplated that computer-readable medium 500 may be any quantity of computer readable media and may comprise various combinations of components and functionalities associated with each component.

The internal parameter component 502 of computer-readable medium 500 is adapted to monitor a temperature within a zone of a building. The temperature set component 504 is adapted to determine an off-peak temperature as a function of a duration of an off-peak operating state of the monitored zone, a desired temperature inside the monitored zone during a subsequent peak operating state of the monitored zone, and optionally information representative of a weather condition surrounding the monitored zone. The control component 506 is adapted to regulate the temperature within the monitored zone during the off-peak operating state as a function of the determined off-peak temperature target. The external parameter component 508 is adapted to obtain the information representative of the weather condition surrounding the monitored zone. The historical data memory component 510 is adapted to store information representative of the temperature within the monitored zone over a period relative to weather condition information. And the alarm component 512 is adapted to detect an error in controlling energy usage of the building and to generate an alarm in response to the detected error.

Embodiments of the invention provide a system for controlling energy usage of a building and may include a temperature sensor to monitor a temperature within a zone of the building; an external sensor to obtain weather condition information; a processor to determine an off-peak temperature target as a function of a duration of an off-peak operating state of the monitored zone, a desired temperature within the monitored zone during a subsequent peak operating state, and optionally the obtained weather condition information; and a controller to control the temperature within the monitored zone during the off-peak operating state based on the determined off-peak temperature target.

Those skilled in the art will appreciate that in some embodiments of the invention, a single system controls the heating and cooling of multiple buildings such as a company with multiple buildings (e.g., a college campus). In such embodiments, a zone may be a room of a building or an entire building.

In one embodiment, one or more computing devices implement embodiments of the invention as illustrated and described herein. For example, the computing devices may include a personal computer (PC), a mainframe, a personal digital assistant (PDA), or a combination of various computing devices or the like. The computing devices may communicate with each other and/or with other computing devices via one or more networks such as an intranet or the Internet.

In addition, the computing devices may have access to one or more computer-readable media storing data such as computer-readable instructions and data structures. The computing devices execute the stored computer-readable instructions to perform the tasks embodied by the computer-readable instructions. The computer-readable media store data in a data signal (e.g., a carrier wave). The data signal has one or more of its characteristics set or changed in such a manner as to encode information in the data signal. As used herein, the terms "computer-readable medium" and "computer-readable media" encompass data signals. Further, the terms "computer-readable medium" and "computer-readable media" encompass a smart tag, a memory device, or any other device for storing data. For example, computer-readable media according to embodiments of the invention may having computer-executable components for controlling energy usage of a building by monitoring a temperature within a zone of the building, determining an off-peak temperature target as a function of a duration of an off-peak operating state and a desired temperature during a subsequent peak operating state of the monitored zone, and regulating the temperature within the monitored zone of the building during the off-peak operating state as a function of the determined off-peak temperature target. In addition, one or more compute-readable media may store weather, system performance, and individual zone data.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A system to control energy usage of a building, said building having a plurality of zones, said zones of the building each having a peak operating state and an off-peak operating state, said system comprising:
    at least one temperature sensor in each of the zones to monitor a temperature therewithin,
    a processor that executes computer-executable instructions to determine an off-peak temperature target as a function of a duration of an off-peak operating state of the monitored zone, as a function of a desired temperature within the monitored zone during a peak operating state of the monitored zone subsequent to said off-peak operating state, and as a function of a usage goal and energy usage of the building, said processor receiving ambient temperature information from a sensor external to the monitored zone, said ambient temperature information indicative of an ambient temperature outside the monitored zone, said received ambient temperature information corresponding to both a sensed heat and a latent heat in the ambient air outside the monitored zone, wherein the peak operating state represents that the monitored zone is in use or occupied and the off-peak operating state represents that the monitored zone is not in use or is unoccupied, wherein the off-peak temperature target is determined for optimizing overall energy usage of the monitored zone during both the peak and the off-peak operating states thereof, and wherein the processor determines the off-peak temperature target to be based on the received ambient temperature information and to be nearer the ambient temperature outside of the monitored zone, as indicated by the received ambient temperature information, than the desired temperature during the subsequent peak operation state,
    a controller associated with the at least one temperature sensor in each of the zones, said controller receiving and responsive to the determined off-peak temperature target for controlling a climate control system of the monitored zone to control the temperature within the monitored zone of the building during the off-peak operating state, said controller controlling the climate control system to maintain the temperature of the monitored zone between the desired temperature and the determined off-peak temperature target during the off-peak operating state, wherein the controller is responsive to the desired temperature to control the climate control system such that the temperature in the monitored zone reaches the desired temperature as said peak operating state begins and to maintain the temperature within the monitored zone of the building at about the desired temperature during the peak operating state,
    a network connecting the at least one temperature sensor and the controller associated therewith for the monitored zone of the building to a temperature sensor and a controller associated therewith for another zone of the building, and
    a memory that stores historical data representative of the temperature within the monitored zone over a period relative to information representative of a weather condition.

2. The system of claim 1, wherein the processor is configured to execute computer-executable instructions for determining the off-peak temperature target as a function of the information representative of a weather condition.

3. The system of claim 2, wherein the information representative of a weather condition is obtained via an external sensor outside of the monitored zone, and wherein the information representative of a weather condition comprises information regarding one or more of the following: ambient temperature outside of the monitored zone, wind speed, wind direction, humidity, dew point, cloudiness, precipitation, fenestration loss, and sunlight intensity.

4. The system of claim 2, wherein said information representative of a weather condition includes information representative of an ambient temperature outside of the monitored zone, and wherein the controller is connected to the climate control system and controls the climate control system to maintain the temperature within the monitored zone at about the off-peak temperature target during the off-peak operating state.

5. The system of claim 4, wherein a difference between the off-peak temperature target and the desired temperature is greater for a relatively longer duration off-peak operating state than for a relatively shorter duration off-peak operating state.

6. The system of claim 1, wherein the stored historical data further comprises the off-peak temperature target over said period.

7. The system of claim 1, further comprising computer-executable instructions executed by the processor to limit access to the stored historical data to a user responsible for controlling the temperature within the monitored zone.

8. The system of claim 1, wherein the duration of the off-peak operating state is a function of expected building usage in the monitored zone.

9. The system of claim 1, wherein the duration of the off-peak operating state and the duration of the peak operating state are preset by a user.

10. The system of claim 1, further comprising computer-executable instructions executed by the processor to obtain information representative of an operation of the climate control system of the building to detect performance of the climate control system.

11. The system of claim 10, wherein said information representative of the operation of the climate control system is obtained via a sensor, said information comprising one or more of the following: steam trap operation, boiler water level, boiler pressure, boiler temperature, hydronic water temperature, hydronic water pressure, and water level in a condensate well.

12. The system of claim 1, further comprising computer-executable instructions executed by the processor to:
   detect an error in controlling the energy usage of the building; and
   provide an alarm in response to the detected error.

13. The system of claim 12, wherein said computer-executable instructions to provide the alarm comprise computer-executable instructions to:
   obtain a list of one or more numbers in response to the detected error;
   call each number of the list of one or more numbers until an acknowledgment is received, whereby for each number called, a message describing said error is communicated for a predetermined period or until the acknowledgment is received; and
   repeat said calling if no acknowledgment is received after each number of the list of one or more numbers is called.

14. The system of claim 1, wherein the computer-executable instructions executed by the processor implement a proportional-integral-derivative (PID) controller.

15. The system of claim 1, wherein the network comprises at least one monitoring device to connect the at least one temperature sensor and the controller associated therewith for the monitored zone of the building to the temperature sensor and the controller associated therewith for the other zone of the building.

16. The system of claim 15, wherein said monitoring device further connects the temperature sensors and the controllers to a bus device, said bus device further connecting the monitoring device to the network including the processor.

17. A system for controlling energy usage of a building, said building having a plurality of zones, each of said zones having a peak operating state representing that the zone is in use or occupied and having an off-peak operating state representing that the zone is not in use or is unoccupied, said system comprising:
   at least one temperature sensor inside each of the zones for monitoring a temperature within each zone;
   at least one temperature sensor external to each of the monitored zones, the external sensor configured to monitor ambient temperature information, said ambient temperature information indicative of both a sensed heat and a latent heat in the ambient air outside the monitored zone;
   a processor that executes computer-executable instructions to determine an off-peak temperature target to be based on the received ambient temperature information and to be nearer the ambient temperature outside the monitored zone than the desired temperature during the subsequent peak operation, for optimizing overall energy usage of the monitored zone during both the peak and the off-peak operating states thereof; said processor determining the off-peak temperature target as a function of a duration of the off-peak operating state of the monitored zone, as a function of a desired temperature within the monitored zone during the peak operating state of the monitored zone subsequent to the off-peak operating state, and as a function of a usage goal and energy usage of the building, said processor further determining the off-peak temperature target to be less than or equal to the desired temperature during heating and greater than or equal to the desired temperature during cooling; and
   a controller associated with the at least one temperature sensor in each of the zones for controlling a climate control system to control the temperature within the monitored zone, said controller receiving and responsive to the off-peak temperature target for controlling the climate control system to maintain the temperature of the monitored zone between the desired temperature and the off-peak temperature target during the off-peak operating state, and said controller receiving and responsive to the desired temperature for controlling the climate control system such that the temperature in the monitored zone reaches the desired temperature as the peak operating state begins and to maintain the temperature of the monitored zone at about the desired temperature during the peak operating state; and
   a network connecting the at least one temperature sensor and the controller associated therewith for the monitored zone of the building to a temperature sensor and a controller associated therewith for another zone of the building.

18. The system of claim 17, wherein the processor is further configured to execute computer-executable instructions for determining the off-peak temperature target as a function of information representative of a weather condition.

19. The system of claim 18, wherein the processor is configured to execute computer-executable instructions for updating the calculated off-peak temperature target as a function of the information representative of a weather condition during the off-peak operating state.

20. The system of claim 18, wherein the information representative of a weather condition is obtained via an external sensor outside of the monitored zone, and wherein the information representative of a weather condition comprises temperature information regarding one or more of the following: wind speed, wind direction, humidity, dew point, cloudiness, precipitation, fenestration loss, and sunlight intensity.

21. The system of claim 18, wherein the controller is connected to the climate control system and controls the climate control system to maintain the temperature within the monitored zone at about the off-peak temperature target during the off-peak operating state.

22. The system of claim 17, wherein a difference between the off-peak temperature target and the desired temperature is greater for a relatively longer duration off-peak operating state than for a relatively shorter duration off-peak operating state.

23. The system of claim 17, further comprising a memory that stores historical data representative of the temperature within the monitored zone over a period relative to information representative of a weather condition.

24. The system of claim 23, wherein the stored historical data further comprises the off-peak temperature target over the period.

25. The system of claim 23, further comprising computer-executable instructions executed by the processor to limit access to the stored historical data to a user responsible for controlling the temperature within the monitored zone.

26. The system of claim 17, wherein the duration of the off-peak operating state is a function of expected building usage in the monitored zone.

27. The system of claim 17, wherein the duration of the off-peak operating state and the duration of the peak operating state are preset by a user.

28. The system of claim 17, further comprising computer-executable instructions executed by the processor to obtain information representative of an operation of the climate control system to detect performance thereof.

29. The system of claim 28, further comprising a sensor for collecting the information representative of the operation of the climate control system and wherein the information representative of the operation of the climate control system comprises one or more of the following: steam trap operation, boiler water level, boiler pressure, boiler temperature, hydronic water temperature, hydronic water pressure, and water level in a condensate well.

30. The system of claim 17, further comprising computer-executable instructions executed by the processor to:
   detect an error in controlling the energy usage of the building; and
   provide an alarm in response to the detected error.

31. The system of claim 30, wherein the computer-executable instructions executed by the processor to provide the alarm comprise computer-executable instructions to:
   obtain a list of one or more numbers in response to the detected error;
   call each number of the list of one or more numbers until an acknowledgment is received, whereby for each number called, a message describing said error is communicated for a predetermined period or until the acknowledgment is received; and
   repeat the calling if no acknowledgment is received after each number of the list of one or more numbers is called.

32. The system of claim 17, wherein the computer-executable instructions executed by the processor implement a proportional-integral-derivative (PID) controller.

33. The system of claim 17, wherein the network comprises at least one monitoring device to connect the at least one temperature sensor and the controller associated therewith for the monitored zone of the building to the temperature sensor and the controller associated therewith for the other zone of the building.

34. The system of claim 33, wherein the monitoring device further connects the temperature sensors and the controllers to a bus device, said bus device further connecting the monitoring device to the network including the processor.

35. The system of claim 14, wherein the PID controller comprises an enthalpy control algorithm, the enthalpy control algorithm determines the off-peak temperature target based on an external sensor measurement of a sensed heat and a latent heat of ambient air outside the monitored zone.

* * * * *